United States Patent
Daniel

(10) Patent No.: US 9,972,215 B2
(45) Date of Patent: May 15, 2018

(54) AUGMENTED REALITY INTERFACE FOR WELD SEQUENCING

(71) Applicant: Lincoln Global, Inc., City of Industry, CA (US)

(72) Inventor: Joseph A. Daniel, Sagamore Hills, OH (US)

(73) Assignee: Lincoln Global, Inc., Santa Fe Springs, CA (US)

(*) Notice: Subject to any disclaimer, the term of this patent is extended or adjusted under 35 U.S.C. 154(b) by 226 days.

(21) Appl. No.: 14/829,161

(22) Filed: Aug. 18, 2015

(65) Prior Publication Data

US 2017/0053557 A1 Feb. 23, 2017

(51) Int. Cl.
| | |
|---|---|
| *G09B 19/00* | (2006.01) |
| *G09B 19/24* | (2006.01) |
| *B23K 9/10* | (2006.01) |
| *A62B 17/04* | (2006.01) |
| *G09B 5/02* | (2006.01) |
| *B23K 9/095* | (2006.01) |

(52) U.S. Cl.
CPC .............. *G09B 19/24* (2013.01); *A62B 17/04* (2013.01); *B23K 9/1006* (2013.01); *B23K 9/095* (2013.01); *B23K 9/0953* (2013.01); *G09B 5/02* (2013.01)

(58) Field of Classification Search
CPC .... B23K 9/095; B23K 9/0953; B23K 9/0596; B23K 9/1056; B23K 9/1062; G02B 2027/0138; G09B 19/24
See application file for complete search history.

(56) References Cited

U.S. PATENT DOCUMENTS

| | | | | |
|---|---|---|---|---|
| 4,153,913 A | * | 5/1979 | Swift | A42B 3/042 |
| | | | | 348/115 |
| 5,533,206 A | * | 7/1996 | Petrie | A61F 9/064 |
| | | | | 2/8.5 |

(Continued)

FOREIGN PATENT DOCUMENTS

| | | |
|---|---|---|
| CN | 101214178 | 7/2008 |
| WO | 2005/102230 | 11/2005 |

OTHER PUBLICATIONS

Hoff et al. "Computer vision-based registration techniques for augmented reality." Proceedings of Intelligent Robots and Computer Vision XV, SPIE vol. 2904, Nov. 18-22, 1996, Boston, MA, pp. 538-548.*

(Continued)

*Primary Examiner* — Robert J Utama
(74) *Attorney, Agent, or Firm* — Calfee, Halter & Griswold LLP

(57) ABSTRACT

A system for providing visual cues to a welder via an augmented reality display for a sequence of operations. The system includes an imaging device that identifies the orientation of an assembly to be welded. Welding operations are associated with locations on the assembly where the welder is to perform the operation. Based on the current field of view and the orientation of the assembly, the system determines whether the location on the assembly is within the field of view of the welder and provides a visual cue to the welder based on the orientation and the field of view. The power source of the welding device may be varied based on the image data received during the welding process.

20 Claims, 9 Drawing Sheets

(56) References Cited

U.S. PATENT DOCUMENTS

| | | | |
|---|---|---|---|
| 5,734,421 A * | 3/1998 | Maguire, Jr. | G06F 3/011 345/8 |
| 5,949,388 A * | 9/1999 | Atsumi | G02B 27/0172 345/53 |
| 6,710,298 B2 * | 3/2004 | Eriksson | A61F 9/06 219/130.01 |
| 6,734,393 B1 | 5/2004 | Friedl et al. | |
| 7,534,005 B1 * | 5/2009 | Buckman | A61F 9/068 2/8.2 |
| 7,962,967 B2 | 6/2011 | Becker et al. | |
| 8,502,866 B2 | 8/2013 | Becker et al. | |
| 8,569,655 B2 | 10/2013 | Cole | |
| RE45,062 E * | 8/2014 | Maguire, Jr. | G06F 3/011 345/8 |
| 8,860,760 B2 * | 10/2014 | Chen | G09G 5/397 345/633 |
| 9,323,056 B2 * | 4/2016 | Williams | G02B 27/017 |
| 2004/0008157 A1 * | 1/2004 | Brubaker | G02B 27/0176 345/8 |
| 2006/0010551 A1 | 1/2006 | Bishop et al. | |
| 2009/0298024 A1 * | 12/2009 | Batzler | B23K 9/32 434/234 |
| 2010/0062406 A1 * | 3/2010 | Zboray | G09B 19/24 434/234 |
| 2012/0081564 A1 * | 4/2012 | Kamiya | G02B 27/017 348/216.1 |
| 2012/0291172 A1 * | 11/2012 | Wills | B23K 9/0956 2/8.2 |
| 2013/0206741 A1 | 8/2013 | Pfeifer et al. | |
| 2013/0242110 A1 | 9/2013 | Terre et al. | |
| 2013/0291271 A1 | 11/2013 | Becker et al. | |
| 2014/0134579 A1 * | 5/2014 | Becker | G09B 5/00 434/234 |
| 2014/0134580 A1 * | 5/2014 | Becker | G09B 9/00 434/234 |
| 2014/0346158 A1 | 11/2014 | Matthews | |
| 2015/0234189 A1 * | 8/2015 | Lyons | G02B 27/0172 345/174 |
| 2015/0268473 A1 * | 9/2015 | Yajima | G02B 27/0172 345/633 |
| 2016/0165220 A1 * | 6/2016 | Fujimaki | G09G 3/36 348/49 |
| 2016/0188277 A1 * | 6/2016 | Miyasaka | G06F 3/1438 345/2.2 |
| 2016/0260261 A1 * | 9/2016 | Hsu | G06T 19/006 |
| 2016/0331592 A1 * | 11/2016 | Stewart | A61F 9/06 |
| 2017/0045337 A1 * | 2/2017 | Kim | G01V 3/08 |

OTHER PUBLICATIONS

Echtler, et al. "The Intelligent Welding Gun: Augmented Reality for Experimental Vehicle Construction." In: Virtual and Augmented Reality Applications in Manufacturing. Ong S.K and Nee A.Y.C, eds. Springer Verlag 2003.*

Mann, Steve, et al., "Realtime HDR (High Dynamic Range) Video for Eyetap Wearable Computers, FPGA-Based Seeing Aids, and Glasseyes (Eyetaps)," Univ. of Toledo, IIEEE Canadian Conf. on Electrical and Computer Eng., 2012.

Hillers, Bernd, et al., "Augmented Reality—The third way for new technologies in welding education," GSI SLV Duisburg, Tech. Conf. "Welding Trainer 2010" Sep. 8-9, 2010, Duisburg, Germany.

Farber, Dan, "The next big thing in tech: Augmented reality," Jun. 7, 2013, 7:09 AM, CNET, Sci-Tech, accessed via the worldwide web on Jan. 15, 2016.

Stone R.T., et al., "Full Virtual Reality vs. Integrated Virtual Reality Training in Welding," Supplement to the Welding Journal, Jun. 2013, vol. 92, pp. 167-174-s.

Aiteanu, D., et al., "A step forward in manual welding: demonstration of augmented reality helmet," IEEE Xplore Abstract, accessed via the worldwide web on Jan. 15, 2016.

Tschirner, Petra, et al., "A Concept for the Application of Augmented Reality in Manual Gas Metal Arc Welding," Proceeding of the Int'l. Symposium on Mixed and Augmented Reality (SMAR'02), IEEE Computer Society, 2002.

* cited by examiner

| Sequence # | Type | Location | Part Number |
|---|---|---|---|
| 1 | Line Weld | (10,15,20)-(10,15,50) | 12345 |
| 2 | Spot Weld | (50,20,12) | 12345 |
| 3 | Inspect Weld | (50,20,12) | 12345 |

FIG. 2

AUGMENTED REALITY INTERFACE FOR WELD SEQUENCING

FIELD

The present invention relates generally to augmented reality systems and more particularly to augmented reality systems that provide visual cues to a welder during a welding process.

INCORPORATION BY REFERENCE

U.S. Ser. No. 14/526,914, filed Oct. 29, 2014, includes information which may be related to the subject matter of the current application. The entire disclosure of this application is incorporated herein by reference in its entirety, including all patents and/or applications incorporated by reference therein.

BACKGROUND OF THE INVENTION

When performing a series of welds, a welder is typically required to perform operations in a particular order or in a particular manner. In instances where a weld or other operation is performed out of sequence, issues may later arise, such as an inability to complete the welding sequence properly (if at all) and/or defects in the finished product, warping of pieces, etc. When a series of welding operations is required, a welder may be provided with written descriptions and diagrams to illustrate the particular operations to be performed, the locations on the overall assembly where the operations are to be performed, and the order in which the operations should be performed. In some instances, the welder may have a video screen that provides the welder with images and/or video of the locations and techniques for various operations. However, written or visual weld sequencing information may often be overlooked or misunderstood, or even ignored by the welder. This is especially likely once the welder becomes familiar with the particular welding sequence.

SUMMARY OF INVENTION

A welder may be required to perform a series of operations on an assembly comprising many separate pieces and requiring multiple discrete welds. The welder is provided with an augmented reality (AR) system that provides visual cues to the welder during the course of performing the required operations. The AR system identifies the orientation of the assembly to be welded via an imaging device, identifies a welding operation that is to be performed by the welder, and then determines a visual cue to provide the welder via a display. The visual cue may prompt the welder with information intended to assist the welder in performing the operation. For example, a visual cue may relate to a weld location, and the cue may be provided by the system such that the cue is displayed overlaid onto the assembly at the location where the weld is to occur. The AR system supports other weld-related functions such as the use of infrared imaging data to verify welding operations.

In one embodiment, a system for providing visual cues to a welder during a series of operations is provided and includes: an imaging device; a display; and a processor; wherein the processor obtains image data from the imaging device, the image data including at least a part of an assembly to be welded that is visible in a field of view of a welder; wherein the processor determines a first operation to be performed from a plurality of predefined operations; and wherein the processor generates a first visual cue and causes the first visual cue to be displayed on the display; whereby the first visual cue facilitates the welder performing the first operation. The system may include one or more of the following features.

In some embodiments, the display may be a transparent surface mounted in a welding helmet.

In some embodiments, the display may be a video screen mounted in a welding helmet.

In some embodiments, the processor may further determine the field of view of the welder based on the image data.

In some embodiments, the imaging device may be mounted on a helmet of the welder.

In some embodiments, the system may further include: a second imaging device; wherein the processor obtains second image data from the second device; and wherein the processor determines the field of view of the welder based on the second image data.

In some embodiments, the system may include: one or more sensors; wherein the one or more sensors monitor movements of at least a portion of the welder; wherein the processor obtains sensor information from the sensors indicative of a current location of the welder; and wherein the processor determines the field of view of the welder based on the sensor information.

In some embodiments, the imaging device may obtain image data of one or more tags associated with points on the assembly to be welded, and the processor may determine an orientation of the assembly relative to the welder based on the one or more tags, and the first visual cue is provided based on the orientation and the field of view of the welder.

In some embodiments, the first operation may be inspecting a location on the assembly.

In some embodiments, the first operation may be a line weld between two locations on the assembly.

In some embodiments, the first operation may be a weld at a welding location on the assembly. In some of those embodiments, the processor may determine that the welding location is visible to the welder based on the orientation and the field of view of the welder, and the first visual cue may be displayed on the display to appear to the welder to be on the assembly at the welding location. In some of those embodiments, the processor may determine that the weld is not visible to the welder based on the orientation and the field of view of the welder, and the first visual cue may facilitate the welder adjusting the field of view so that the welding location is within the field of view of the welder.

In some embodiments, a second operation to be performed may be determined from the plurality of operations; and the processor may generate a second visual cue and subsequently provides the second visual cue to the display. In some of those embodiments, the processor may verify that the first operation has been completed; and the processor may not provide the second visual cue until the first operation has been verified. In some of those versions, the processor may verify that the first operation has been completed based on the image data. In other versions, the system may further include: an infrared device; wherein the infrared device provides infrared data to the processor; and wherein the processor verifies that the first operation has been completed based on the infrared data. In other versions, verifying that the first operation has been completed may include verifying that the first operation was correctly performed. In other versions, the system may further include a power supply, wherein the power supply powers a welding device; wherein the processor determines when the welder has completed the first operation; wherein the processor provides an indication to the power supply to interrupt power to the welding device after the processor has verified that the welder has completed the first operation; and wherein the processor provides an indication to the power supply to power the welding device once the first operation has been verified.

In another embodiment, a method of providing visual cues to a welder during a series of operations is provided and includes the steps of: receiving assembly information, the assembly information including an identifier of an assembly to be welded; identifying a series of operations based on the assembly information, the series of operations being arranged in a pre-determined sequence order, with each operation including sequence number, an operation type, and an operation location where the operation is to be performed on the assembly; selecting a welding operation, from the series of operations, to be performed based on its sequence number; determining a visual cue to provide to a display based on an orientation of the assembly relative to the welder and a type of the welding operation; and providing, via the display, the visual cue within a field of view of the welder to facilitate the welder performing the welding operation. The method may include one or more of the following features.

In some embodiments, determining the visual cue may include: determining the field of view of the welder; determining, based on the field of view of the welder and the orientation of the assembly, whether the operation location is within the field of view of the welder; and selecting the visual cue based on whether the operation location is within the field of view of the welder. In some of those embodiments, if the operation location is not within the field of view of the welder, the method may further include: determining the visual cue to facilitate the welder adjusting the field of view so that the operation location is within the field of view of the welder; monitoring the field of view of the welder and the orientation of the assembly until the operation location is within the field of view of the welder; determining a second visual cue based on the orientation of the assembly and the type of the operation; and providing, via the display, the second visual cue within the field of view of the welder. The visual cue may an arrow indicating a direction for the welder to move to reposition the field of view so that the operation location is within the field of view. The visual cue may be an arrow indicating to reposition the assembly so that the operation is within the field of view.

Numerous aspects of the general inventive concepts will become readily apparent from the following detailed description of exemplary embodiments, from the claims and from the accompanying drawings.

BRIEF DESCRIPTION OF THE DRAWINGS

In the accompanying drawings, which are incorporated in and constitute a part of the specification, embodiments of the invention are illustrated, which, together with a general description of the invention given above, and the detailed description given below, serve to illustrate exemplary embodiments of the general inventive concepts.

FIG. 2 is a table of information related to a series of welds, according to an exemplary embodiment;

DETAILED DESCRIPTION

Figure 1:
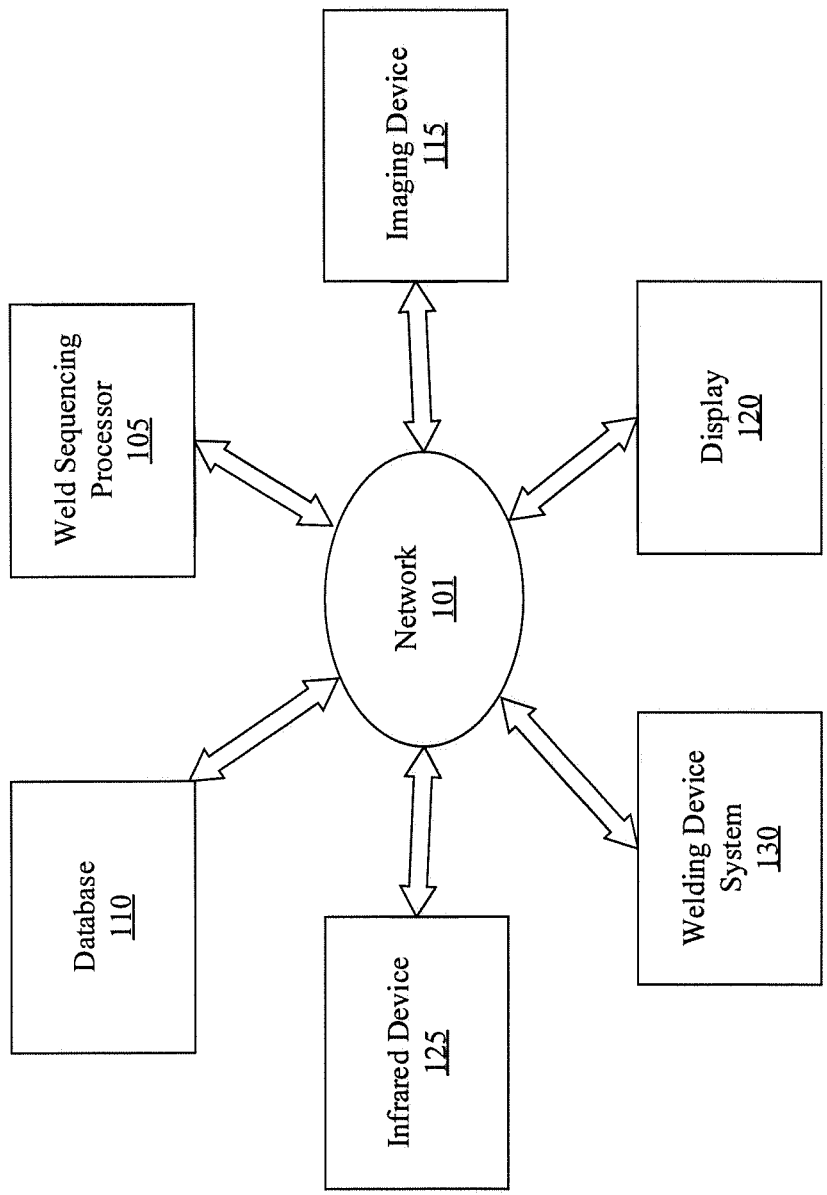
FIG. 1 is a block diagram of an augmented reality system according to an exemplary embodiment.

Referring now to the drawings, which are for the purpose of illustrating exemplary embodiments of the invention only and not for the purpose of limiting same, FIG. 1 discloses an exemplary system for providing visual cues to a welder during a series of welding operations. The system 100 includes a weld sequencing processor 105, an imaging device 115, a display 120, and an infrared device 125. The components are in communication via communication network 101. Communication network 101 may include one or more wired or wireless networks protocols or connections, such as a local area network (LAN), a wide area network (WAN), Bluetooth, RF, or NFC. In one exemplary embodiment, the communication network 101 may utilize the Internet. In some embodiments, one or more components illustrated in FIG. 1 may be omitted, such as infrared device 125. In some embodiments, one or more components illustrated in FIG. 1 may be integrated or otherwise combined into a single component. For example, the weld sequencing processor 105 may be included in a welding helmet along with the display 120. In some embodiments, additional components may be present. For example, multiple imaging devices 115, such as multiple video cameras, may be included with the system and may each capture different angles and/or aspects of the welding surface(s). In some embodiments, one or more of the components of FIG. 1 may include aspects of the computer system illustrated in FIG. 7. For example, welding device system 130 and/or weld sequencing processor 105 may include one or more of the components of the computer system illustrated in FIG. 7 and described herein.

The weld sequencing processor 105 identifies a series of welding operations to be performed on an assembly and provides visual cues to a welder via the display 120. The weld sequencing processor 105 may receive as input an identifier of an assembly to be welded and, based thereon, identify a series of welds to be performed on the assembly via the sequence database 110. An assembly may include one or more parts that require welding together. For example, an "assembly," as used herein, may include one or more separate or partially connected structures. In some embodiments, a welder may identify or otherwise receive an assembly or part number associated with the assembly and provide the identifying number to the weld sequencing processor 105. For example, an assembly or one or more parts of the assembly may have an alphanumerical code associated with it, and the welder may input the associated number to the weld sequencing processor 105 via a keyboard or other input device, such as a barcode scanner. In some embodiments, the weld sequencing processor 105 may receive image data of an assembly and identify the assembly by processing the image data. For example, the weld sequencing processor 105 may determine the shape and size of an assembly by processing an image of the assembly provided by the imaging device 115 and comparing the determined shape and size with potential matching parts in a database of profiles. As another example, the weld sequencing processor 105 may use visual image data to identify a code (such as a UPC code or other machine readable code) located on or near the assembly.

The weld sequencing processor 105 may identify one or more sequences of welds via a sequence database 110. For a given assembly, the sequence database 110 may include information related to a series of operations to be performed on the part. Operations may include, for example, performing various types of welds utilizing various welding techniques, changing the position of one or more parts of the assembly, repositioning one or more parts relative to each other, and/or other operations that may be required during the welding process. For each operation, the sequence database 110 may include location information indicating where on a welding assembly a particular operation is to be performed. For example, for a line weld, the sequence database 110 may have positional coordinates for the start location and stop location on the assembly (or coordinates for a series of locations along a weld line). Also, for example, the sequence database 110 may have orientation information indicating a correct position for a part on the assembly.

Figure 2:
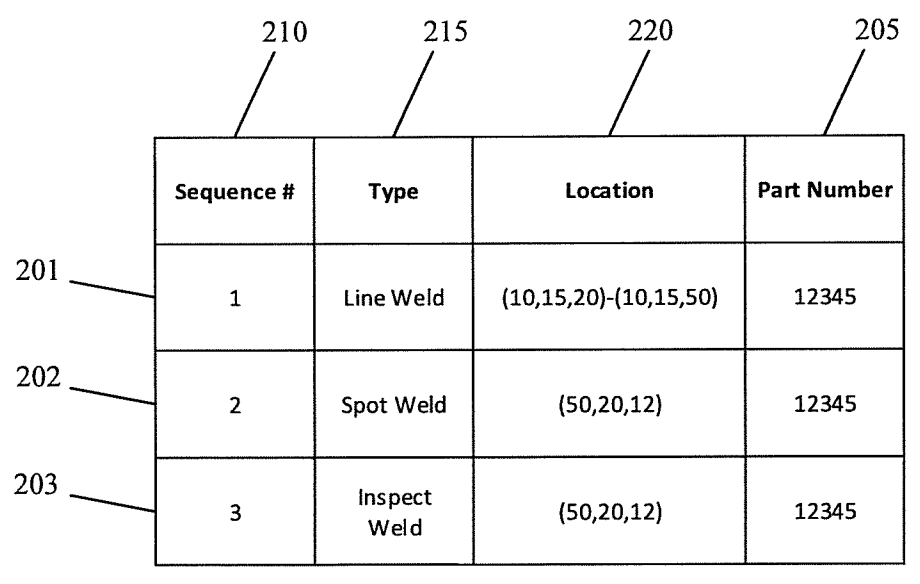

For a given assembly, the sequence database 110 may indicate a series of operations with a strict sequencing requirement. Referring to FIG. 2, a series of operations to be performed is illustrated. For each record in the sequence database 110, a part number 205, a sequence number 210, an operation type 215, and location information 220 are provided. In the example shown in FIG. 2, the operations are for an assembly with an identifier of "12345," which may be identified by the welder and input to the weld sequencing processor 105 or otherwise identified by the weld sequencing processor 105 as described herein. Each identified operation includes a sequence number that indicates when, in a sequence of welds, the operation is to occur. For example, operation 201 is the first operation in a series of operations to be performed on Assembly "12345," operation 202 is the second operation to be performed on Assembly "12345," and operation 203 is the third operation to be performed on Assembly "12345." Deviation from this sequence can give rise to problems such as lower production efficiency, decreased safety, reduced quality, etc. Each operation includes an operation type 215, which indicates what action the welder is to perform to complete that operation. For example, operation 201 is a "line weld," operation 202 is a "spot weld," and operation 203 is to "inspect weld." Each of the operations is additionally associated with a particular location 220. The locations may be identified by, for example, a three dimensional Cartesian coordinate in the case of a point location, as in operations 202 and 203, or series of coordinates in the case of a more complex location, as in operation 201.

In some embodiments, the welder may provide the weld sequencing processor 105 with additional information prior to welding an assembly. For example, the welder may provide identification for verifying that the current welder is authorized to weld the current assembly (such as by confirming certifications of the welder and/or other available information regarding the welder). In some embodiments, the welder may provide the weld sequencing processor 105 with information related to physical aspects of the welding device, such as the base materials of the assembly, the consumables being used during the weld, and/or the power source settings. In some embodiments, the weld sequencing processor 105 may obtain information related to physical aspects of the welding device from the welding device system 130 and further verify that the settings are acceptable before providing the welder with a visual cue.

The imaging device 115 may capture real time visual information and provide the visual information to the weld sequencing processor 105 for processing. In some embodiments, the imaging device 115 may be a video camera that is located in a stationary position near the welder and the assembly to be welded. For example, the imaging device 115 may be located above the assembly to be welded and may capture images of part of the assembly and the welder to determine the location of the welder relative to the part and further determine the orientation of the assembly relative to the welder. In some embodiments, the imaging device 115 may be located on the welder, such as on the exterior of a welding helmet, and may capture images of the assembly to be welded (and orientation of the assembly) relative to the field of view of the welder. In some embodiments, multiple imaging devices may be utilized. For example, a stationary imaging device may capture images of the assembly to determine the orientation of the assembly relative to a reference point and an imaging device on the welding helmet may capture images of same assembly relative to the welder (i.e., images that reflect what the welder can currently see).

A display 120 may be provided to a welder such that the welder may view indications provided on the display 120 in addition to the assembly that is being welded. In some embodiments, the display 120 may be an augmented reality display that projects images onto a screen while the welder is performing operations. For example, the display 120 may be technology, such as the DAQRI technology or GOOGLE GLASS, that is incorporated into a welding helmet. In some embodiments, the display 120 may be a video screen, such as an LCD screen, that projects images captured by the imaging device 115. For example, the display 120 may be positioned inside of a welding helmet in the field of view of the welder, the imaging device 115 may be positioned on the outside of the welding helmet near the field of view of the welder, and a video from imaging device 115 may be displayed on display 120.

The welding device system 130 may include a welding torch and a power supply for the welding torch. The welding device system 130 may additionally include one or more interfaces to allow the welder to adjust parameters during the welding process. For example, the welding device system 130 may include an interface to adjust the current that is being delivered to the welding torch during operation. In some embodiments, the welding device system 130 may be in communication with the weld sequencing processor 105, which may automatically adjust one or more parameters while the welder is performing an operation. Also, for example, the weld sequencing processor 105 may interrupt the power to the welding torch during operation of the torch to prevent the welder from continuing operation.

Figure 3:
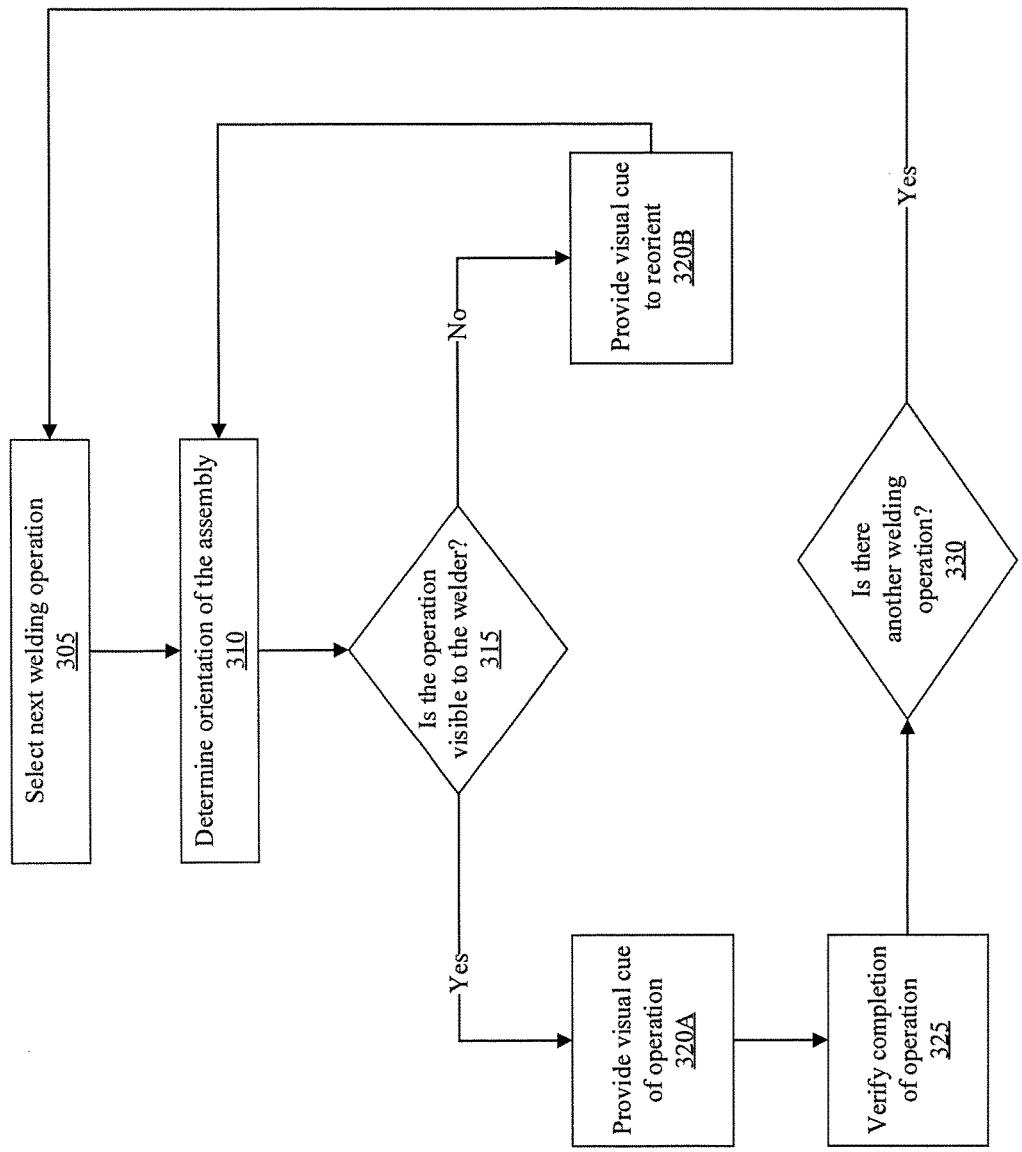
FIG. 3 is a flowchart of a method of providing a cue during a series of welding operations, according to an exemplary embodiment.

Referring to FIG. 3, a flowchart of a method for providing a welder with visual cues is provided. At step 305, the next welding operation in a sequence of operations is identified. The next welding operation may be identified by a component that shares one or more characteristics with the weld sequencing processor 105. In some embodiments, the weld sequencing processor 105 may have previously identified the assembly that is currently being welded and may identify the sequence of welds in sequence database 110. For example, the weld sequencing processor 105 may identify the particular part number of the assembly that is being welded and further identify the welds illustrated in FIG. 2.

Figure 4:
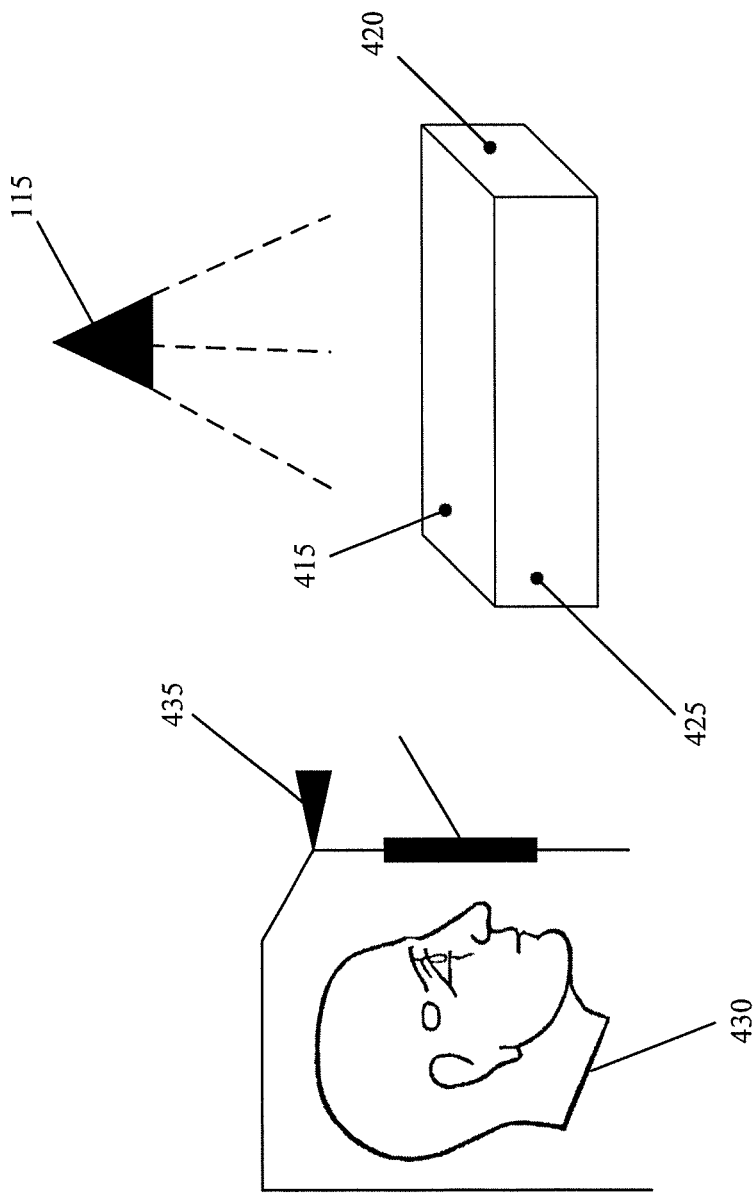
FIG. 4 is a diagram illustrating operation of the system of FIG. 1 and the method of FIG. 3.

At step 310, the orientation of the assembly is determined. In some embodiments, the weld sequencing processor 105 may receive image data from the imaging device 115 and determine, based on the image data, the current orientation of the assembly. For example, the assembly may be tagged with one or more markers that may be identified from the processed image data, and based on the markers, the weld sequencing processor 105 may determine the three dimensional orientation of the assembly. For example, referring to FIG. 4, an exemplary, imaging device setup is provided. The imaging device 115 is positioned so that it may capture images that include the assembly 410. The assembly 410 is tagged with markers 415, 420, and 425 so that one or more of the markers may be visible in the images captured by the imaging device 115. The weld sequencing processor 105 may identify the markers 415, 420, and 425 in the image data and reconstruct a three dimensional model of the assembly stored in memory.

Further, the imaging device 115 may receive field of view information indicative of the current view of the welder 430. In some embodiments, the imaging device 115 may capture the current location of the welder and, via image processing, the weld sequencing processor 105 may determine the current position and field of view of the welder 430. In some embodiments, a welder imaging device 435 may capture the current field of view of the welder and provide the field of view image information to the weld sequencing processor 105 to determine the current field of view of the welder. In some embodiments, the welder imaging device 435 may be the only imaging device, and the weld sequencing processor 105 may utilize images from the welder imaging device 435 to determine both the orientation of the assembly and the field of view of the welder.

In some embodiments, the weld sequencing processor 105 may determine a current location of the welder based on one or more sensors associated with the welder. For example, a welding helmet that is worn by the welder may include sensors that provides spatial coordinates that may be utilized by weld sequencing processor to determine the direction the welder is currently facing, the angle of vision of the welder, and/or other coordinates that may be utilized to determine how the welder is positioned and what is currently visible to the welder. In some embodiments, other sensors may be utilized to track and determine the current location of the welder, such as accelerometers, sonic probes, and radar probes.

Figure 5A:
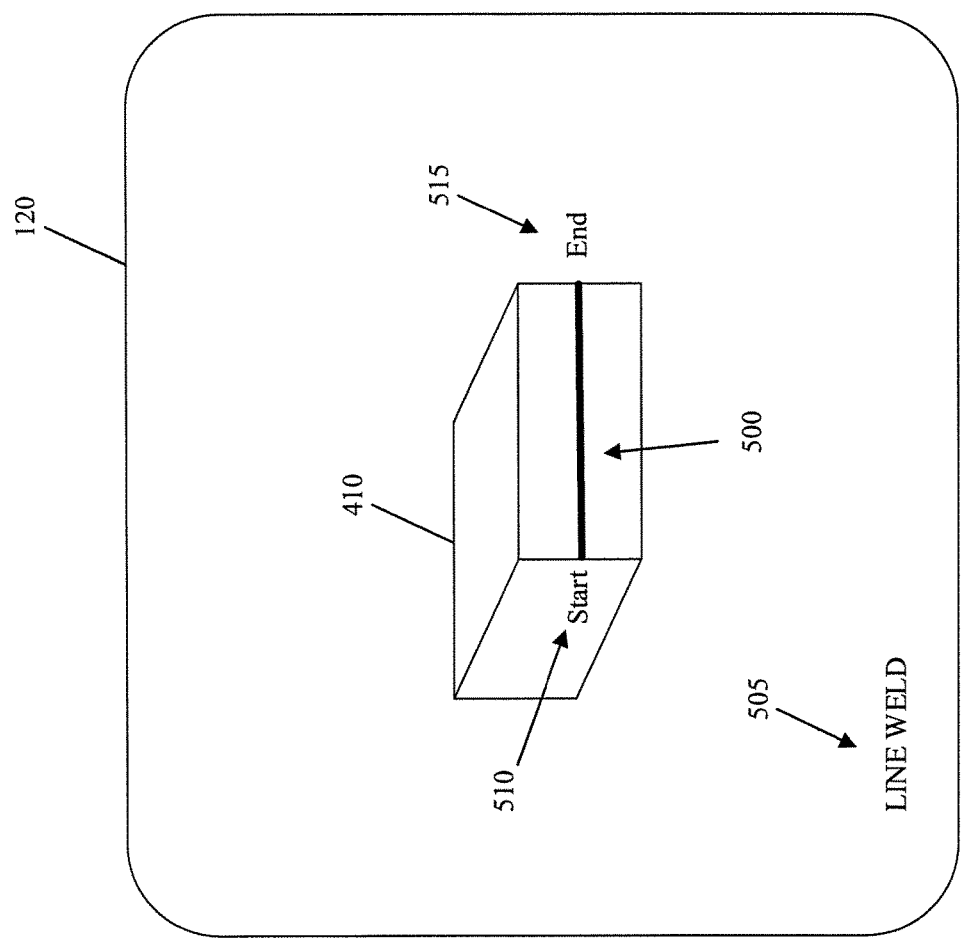
FIGS. 5A through 6B are diagrams showing examples of visual cues provides to a welder via the system of FIG. 1 and the method of FIG. 3.

At step 315, based on the orientation of the assembly and the welder field of view information, the weld sequencing processor 105 may determine whether the current welding operation is visible to the welder. In some embodiments, the weld sequencing processor 105 may determine whether a coordinate or set of coordinates associated with the current welding operation is visible in the field of view of the welder based on the determined orientation of the assembly. For example, referring to FIG. 5A, a field of view of a welder is provided. The welder is currently viewing assembly 410. The weld sequencing processor 105 may determine the current orientation of assembly 410 and the field of view of the welder, as described herein, and may further identify the next welding operation from a sequence of welding operations stored in the sequence database 110, as illustrated in FIG. 2. For example, the weld sequencing processor 105 may identify operation 201 as the next welding operation to be performed and further identify the associated start point (10, 15, 20) and end point (10, 15, 50) of the operation (in this case, a line weld).

If the current welding operation is within the field of view of the welder, a visual cue of the welding operation is provided to the display 120 at step 320A. For each type of welding operation, the weld sequencing processor 105 may provide a particular type of visual cue to the welder to indicate the type of operation to be performed. In some embodiments, visual cues may include, for example, a weld line, an indicator of a point where a weld is to occur, an arrow indicating where a welder is to inspect, and an arrow indicating how a welder is to reposition an assembly. For example, referring again to FIG. 5A, a weld line 500 is provided to the display 115 to indicate where the welder is to perform weld 201. The visual cue may be provided to the welder via the display 120 such that, to the welder, the visual cue appears on the assembly at the location where the operation is to be performed. The weld sequencing processor 105 may determine, based on the assembly orientation and the welder field of view, where on the display to provide the visual cue.

In some embodiments, the visual cues may be provided with additional messages to assist the welder in performing the welding operation. For example, referring again to FIG. 5A, "START" message 510 and "END" message 515 may be provided with the weld line 500 to indicate to the welder where to begin and end the weld. In some embodiments, the visual cue may vary as the welder performs a welding operation. For example, a visual cue of a location to start a weld may initially be provided to the welder with an arrow indicating the direction to weld, and the arrow may move as the welder performs the weld. The weld sequencing processor 105 may receive information from the welding device system 130 that indicates when a welder has started a weld and/or when the welder makes adjustments during the welding operation. In some implementations, other information may be displayed with the visual cue, such as an informational message regarding the current welding operation to be performed. For example, the weld operation message 505 indicates that the welder is to perform a "line weld."

Figure 6A:
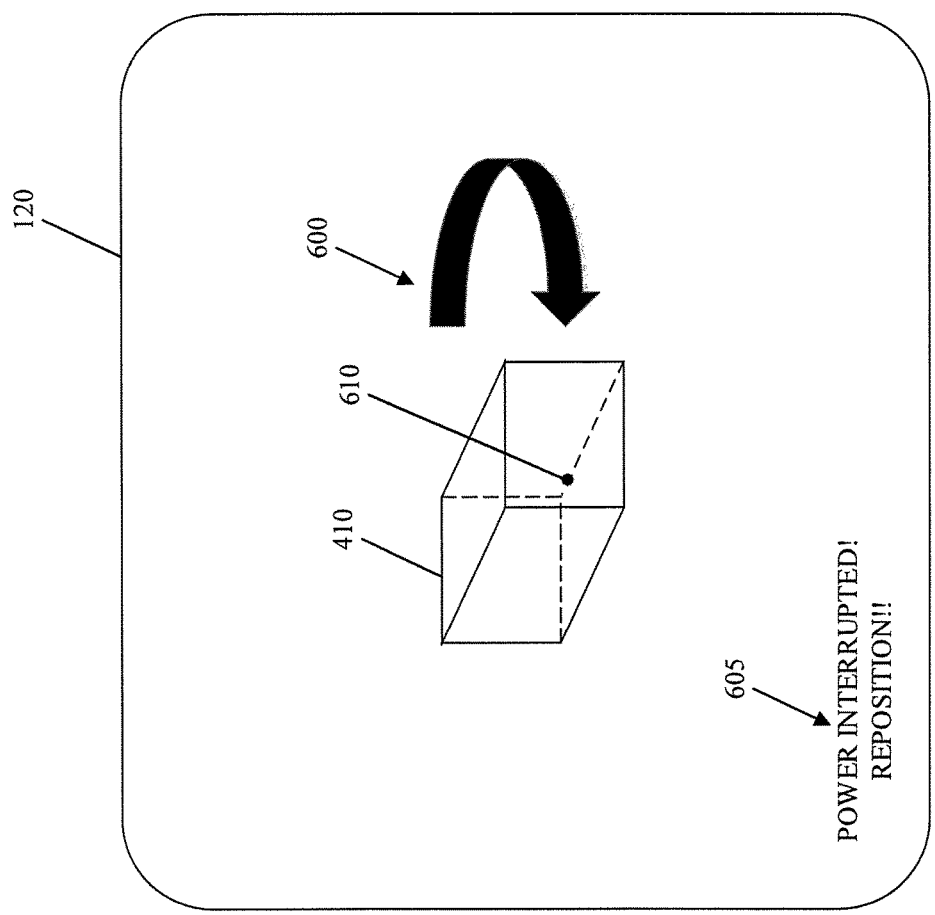

If the weld sequencing processor 105 determines, based on the assembly orientation and the welder field of view information, that the current welding operation is not visible to the welder, a visual cue may be provided to the display 120 to indicate to the welder to either reposition the assembly or reposition the field of view (at step 320B). Referring to FIG. 6A, a field of view of a welder is illustrated with a visual cue indicating that the welding operation is not within the field of view of the welder. The weld sequencing processor 105 may identify that the coordinates of a welding operation are not currently visible to the welder and may determine a visual cue to assist the welder in locating the next welding operation location. For example, the welding operation may be a spot weld at location 610 (a non-visible corner of assembly 410). The weld sequencing processor 105 may determine, based on the current position of location 610, the welder would be required to rotate assembly 410 until location 610 is within the welder field of view. The weld sequencing processor 105 may determine the orientation of an arrow to provide as a visual cue to the welder in a location on display 120 that would assist the welder in locating the welding operation location 610. The weld sequencing processor 105 may then continue to monitor the assembly orientation and field of view at step 310 until the welding operation is visible to the welder.

In some embodiments, the weld sequencing processor 105 may adjust and/or interrupt the power supply to the welder via the welding device system 130 during welding operations based on the visual cues provided to the welder. For example, referring again to FIG. 6A, the location of the current welding operation is not visible to the welder, so the welder has been provided with a visual cue of an arrow 600 to indicate how to reorient the assembly 410. In addition, the welder has been provided with a message 605 indicating that power has been interrupted to the welding torch. The weld sequencing processor 105 may interrupt power to a welding torch while a weld location is not visible and/or when the next welding operation does not include welding, and then later reinstate power or allow the welder to reinstate power once a location that requires use of the welding torch is visible (and the current welding operation is a weld).

Figure 5B:
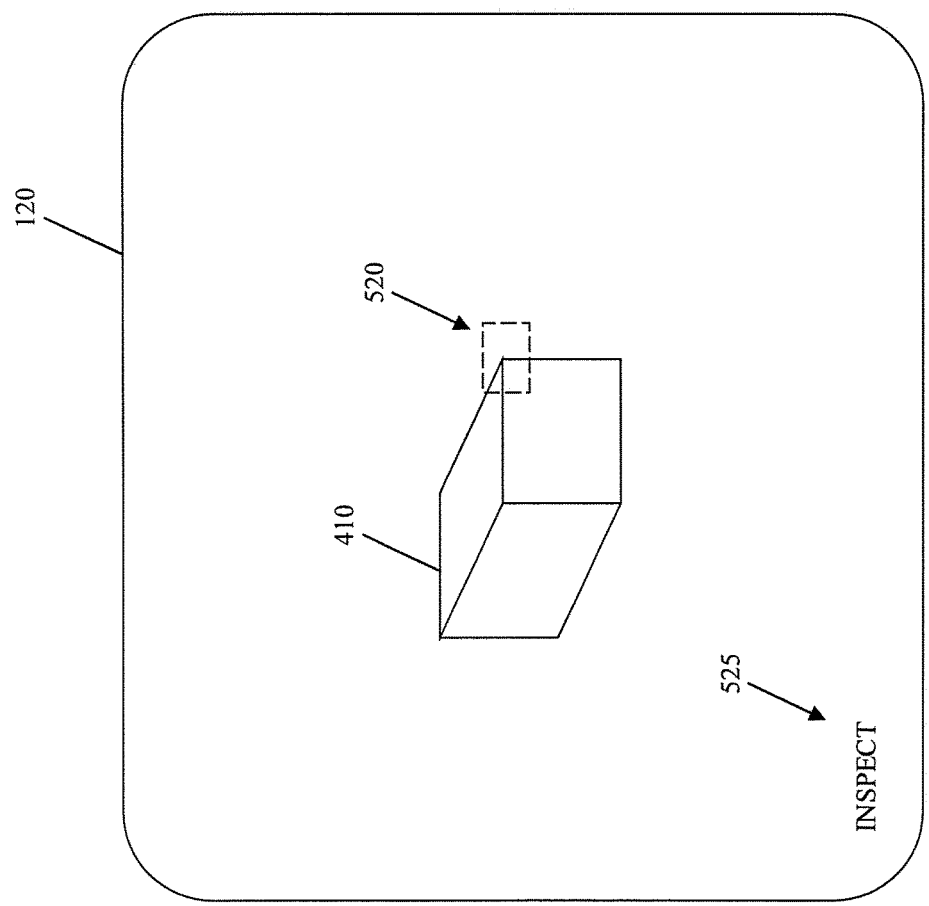

Referring to FIG. 5B, another exemplary field of view of a welder is provided. The message 525 indicates that the operation is an inspection, thus the operation does not require the use of a welding torch. In some embodiments, the weld sequencing processor 105 may interrupt power to the welding torch while the inspection occurs, and then automatically reinstate power once the inspection is completed. Alternatively, the weld sequencing processor 105 may interrupt power and the welder may indicate, such as via an interface with the welding device system 130 and/or the weld sequencing processor 105, that the inspection has been completed. The field of view of FIG. 5B includes an inspection area box 520 located around an area associated with the operation.

Figure 6B:
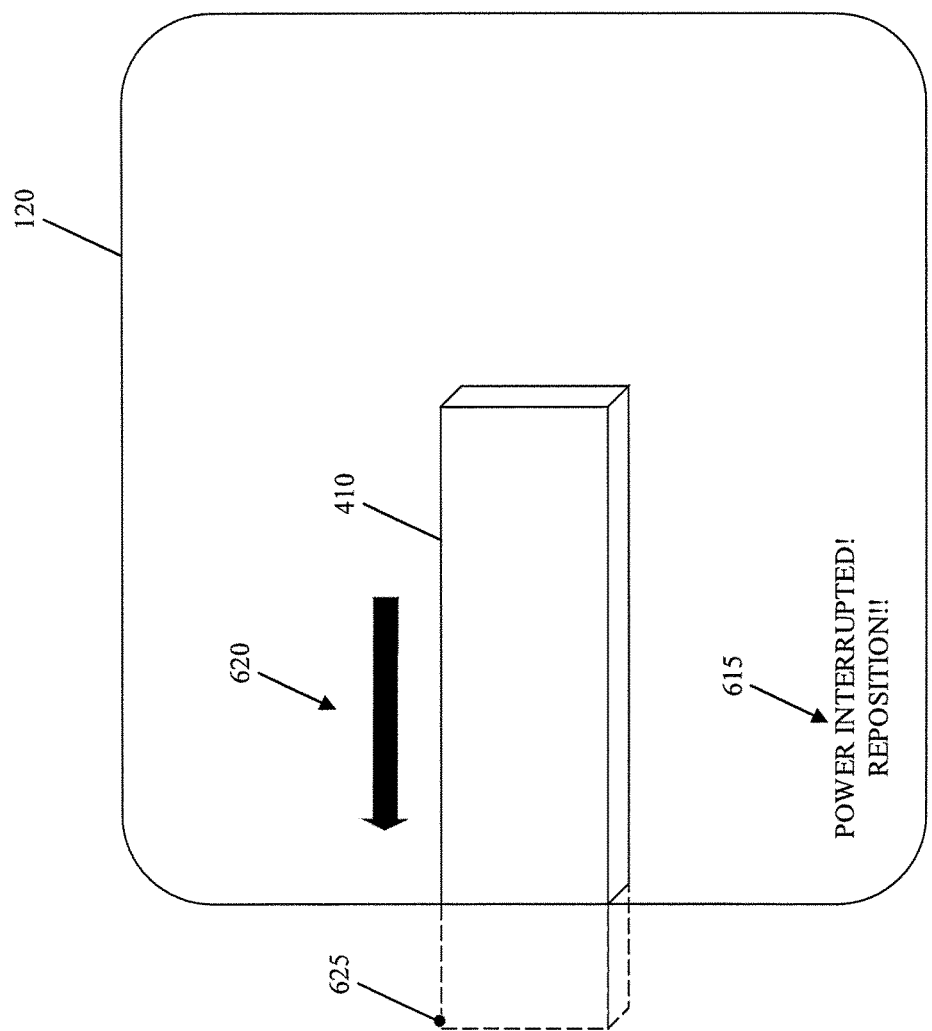

Referring to FIG. 6B, an additional exemplary welder field of view is illustrated. In the illustrated view, the welding operation location 625 on assembly 410 is outside the field of view of the welder (shown by the dotted lines indicating the boundaries of assembly 410 outside the display 120). The weld sequencing processor 105 may determine that the welding operation location 625 is to the left of the current welder field of view based on the assembly orientation and the welder field of view information, as described herein. The weld sequencing processor 105 may determine that an arrow, pointing to the left may be provided as a visual cue at step 320B. The arrow may be stationary or the arrow may move to readjust as the welder changes the orientation of the assembly 410 or the welder's field of view. In some embodiments, additional messages may be provided with the visual cue to further assist the welder in performing the welding operation (text messages, audio cues, etc.). For example, in the illustrated example, the welder is provided with the message 615, which informs the welder of pertinent information (i.e., that the system has identified that the welder cannot currently see the weld location and that power has been interrupted to the welding torch).

Referring again to FIG. 3, at step 325, weld sequencing processor 105 may identify that a welding operation has been completed. Weld sequencing processor 105 may utilize, for example, image data from the imaging device 115 to monitor the welding torch as it begins and ends a weld to determine when a weld has been completed. Also, for example, the weld sequencing processor 105 may receive information from the welding device system 130 that indicates when the welding is no longer in operation. Once the weld sequencing processor 105 has verified that the welding operation is completed, it may identify the next weld in the welding sequence at step 330 and subsequently provide a visual cue for the next welding operation.

Referring again to FIG. 1, some embodiments may include an infrared device 125 that may be utilized to determine when a weld has been completed. The infrared device may be, for example, an infrared camera and/or other sensor that may capture infrared image information and provide the image data to the weld sequencing processor 105. The infrared image data may be utilized to determine the exact location of the start and end of a weld based on the heat signature of the weld. The weld sequencing processor 105 may utilize the temperature information to determine, for example, whether a weld was performed at the correct location, whether the weld was performed with the correct technique, and/or to otherwise verify that the weld has been completed.

In some embodiments, the infrared image data from the infrared device 125 may be utilized to vary the power supply during the welding process. For example, based on determining the temperature of a weld and the location of the weld, the weld sequence processor 105 may vary the current to the welding torch to adjust the weld as it is being performed. Also, for example, the weld sequencing processor 105 may identify the location where the weld is being performed and interrupt the power supply to the welding torch if the welder is not properly performing the operation (e.g., welding in the wrong location, veering more than a threshold distance from the proper location of a weld, welding with incorrect settings). In some embodiments, the weld sequencing processor 105 may prevent further welding until it has verified, either through the infrared or visible light image data, that a welding operation was correctly completed.

Figure 7:
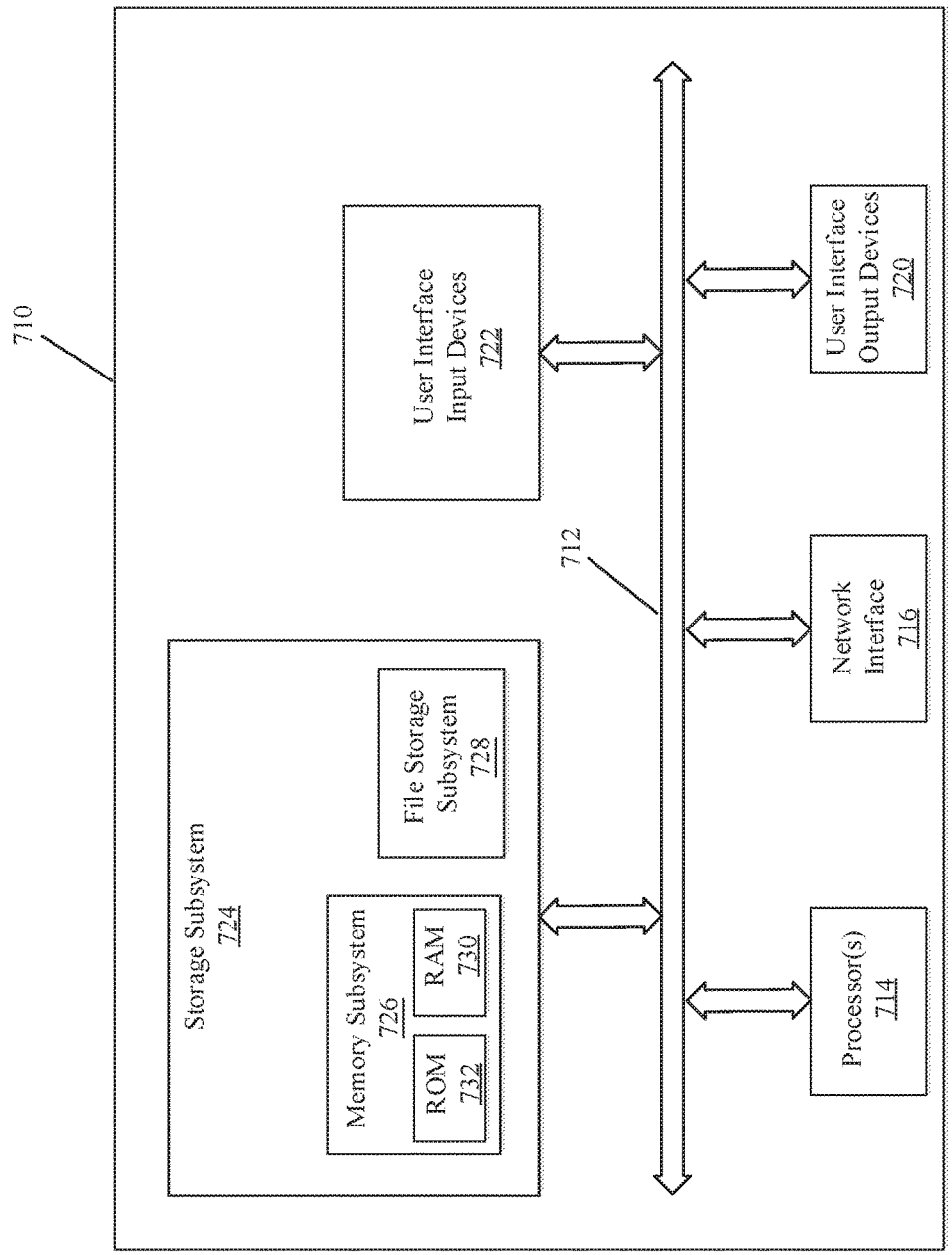
FIG. 7 is a block diagram of an example computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 726 and a file storage subsystem 728, user interface input devices 722, user interface output devices 720, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to identify and/or transmit actionable content from a computing device to one or more other computing devices based on the likelihood of a user having interest in accessing the actionable content from the other computing devices.

These software modules are generally executed by processor 714 alone or in combination with other processors. Memory 726 used in the storage subsystem can include a number of memories including a main random access memory (RAM) 730 for storage of instructions and data during program execution and a read only memory (ROM) 732 in which fixed instructions are stored. A file storage subsystem 728 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 728 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative embodiments of the bus subsystem may use multiple busses.

Computer system 710 can be of varying types including a workstation, server, computing cluster, blade server, server farm, or any other data processing system or computing device. Due to the ever-changing nature of computing devices and networks, the description of computer system 710 depicted in FIG. 7 is intended only as a specific example for purposes of illustrating some embodiments. Many other configurations of computer system 710 are possible having more or fewer components than the computer system depicted in FIG. 7.

The above description of specific embodiments has been given by way of example. From the disclosure given, those skilled in the art will not only understand the general inventive concepts and attendant advantages, but will also find apparent various changes and modifications to the structures and methods disclosed. For example, alternative methods and/or systems with additional or alternative components may be utilized to determine the orientation of an assembly relative to a welder. It is sought, therefore, to cover all such changes and modifications as fall within the spirit and scope of the general inventive concepts, as defined by the appended claims, and equivalents thereof.

The invention claimed is:

1. A system for providing visual cues to a welder, the system comprising:
   an imaging device;
   a display mounted in a welding helmet;
   a processor; and
   a data store,
   wherein the processor obtains a sequence listing from the data store, the sequence listing defining a plurality of ordered operations to be performed on an assembly to be welded;
   wherein the processor obtains image data from the imaging device, the image data including at least a part of the assembly that is visible in a field of view of a welder;
   wherein the processor determines a first operation to be performed from the sequence listing;
   wherein the processor generates a first visual cue and causes the first visual cue to be displayed on the display, the first visual cue facilitating the welder performing the first operation;
   wherein the processor determines a second operation to be performed from the sequence listing;
   wherein the processor generates a second visual cue and causes the second visual cue to be displayed on the display, the second visual cue facilitating the welder performing the second operation;
   wherein one of the first operation and the second operation is a welding operation, while the other of the first operation and the second operation is a non-welding operation.

2. The system of claim 1, wherein the display is a transparent surface.

3. The system of claim 1, wherein the display is a video screen.

4. The system of claim 1, wherein the processor further determines the field of view of the welder based on the image data.

5. The system of claim 1, wherein the imaging device is mounted on a helmet of the welder.

6. The system of claim 1, further comprising:
   one or more sensors;
   wherein the one or more sensors monitor movements of at least a portion of the welder;
   wherein the processor obtains sensor information from the sensors indicative of a current location of the welder; and
   wherein the processor determines the field of view of the welder based on the sensor information.

7. The system of claim 1, wherein the imaging device obtains image data of one or more tags associated with points on the assembly to be welded;
   wherein the processor determines an orientation of the assembly relative to the welder based on the one or more tags, and
   wherein the first visual cue is provided based on the orientation and the field of view of the welder.

8. The system of claim 1, wherein the first operation is inspecting a location on the assembly, and
   wherein the first visual cue is a shape surrounding the location.

9. The system of claim 1, wherein the first operation is a line weld between two locations on the assembly, and
   wherein the first visual cue is a line extending between the two locations.

10. The system of claim 1, wherein the first operation is a spot weld at a welding location on the assembly, and
    wherein the first visual cue indicates the welding location.

11. A system for providing visual cues to a welder, the system comprising:
    an imaging device;
    a display; and
    a processor,
    wherein the processor obtains image data from the imaging device, the image data including at least a part of an assembly that is visible in a field of view of a welder;
    wherein the processor determines a first operation to be performed from a plurality of predefined operations, the first operation to be performed at a location on the assembly;
    wherein the processor generates a visual cue and causes the visual cue to be displayed on the display;
    wherein the processor uses the image data to determine an orientation of the assembly relative to the welder;
    wherein the processor uses the image data to determine the field of view of the welder;
    wherein the processor determines whether the location is visible to the welder based on the orientation of the assembly and the field of view of the welder,
    wherein, if the location is visible to the welder, the visual cue is displayed on the display to appear to the welder to be at or in proximity to the location on the assembly, the visual cue facilitating the welder performing the first operation; and wherein, if the location is not visible to the welder, the visual cue is displayed on the display to facilitate the welder adjusting the field of view so that the location is within the field of view of the welder.

12. The system of claim 1, wherein the processor verifies that the first operation has been completed; and
wherein the processor does not provide the second visual cue until the first operation has been verified.

13. The system of claim 12, wherein the processor verifies that the first operation has been completed based on the image data.

14. The system of claim 12, further comprising:
an infrared device;
wherein the infrared device provides infrared data to the processor; and
wherein the processor verifies that the first operation has been completed based on the infrared data.

15. The system of claim 1, further comprising:
a power supply;
wherein the power supply powers a welding device used by the welder to perform the first operation;
wherein if the processor determines that the welder is not properly performing the first operation, the processor provides an indication to the power supply to interrupt power to the welding device.

16. A system for providing visual cues to a welder, the system comprising:
a first imaging device, the first imaging device being stationary and located external to the welder;
a second imaging device, wherein the second imaging device is configured to be worn by the welder;
a display; and
a processor,
wherein the processor obtains first image data from the first imaging device, the first image data including at least a first part of an assembly;
wherein the processor obtains second image data from the second imaging device, the second image data including at least a second part of the assembly;
wherein the processor uses the first image data to determine a first orientation of the assembly relative to a fixed reference point;
wherein the processor uses the second image data to determine a second orientation of the assembly relative to the welder;
wherein the processor determines whether a location on the assembly in which an operation is to be performed is visible to the welder based on at least one of the first orientation of the assembly and the second orientation of the assembly;
wherein, if the location is visible to the welder, a first visual cue is displayed on the display to appear to the welder to be at or in proximity to the location on the assembly, the first visual cue facilitating the welder performing the operation; and
wherein, if the location is not visible to the welder, a second visual cue is displayed on the display to facilitate the welder adjusting the field of view so that the location is within the field of view of the welder.

17. The system of claim 16, wherein the second imaging device configured to be worn by the welder is mounted on a helmet of the welder.

18. The system of claim 16, wherein the first part and the second part are the same.

19. The system of claim 16, wherein the operation is a welding operation.

20. The system of claim 16, wherein the operation is a non-welding operation.

* * * * *